(12) United States Patent
Watanabe

(10) Patent No.: US 8,111,877 B2
(45) Date of Patent: Feb. 7, 2012

(54) IMAGE PROCESSING DEVICE AND STORAGE MEDIUM STORING IMAGE PROCESSING PROGRAM

(75) Inventor: Nobuyuki Watanabe, Yokohama (JP)

(73) Assignee: Olympus Corporation, Tokyo (JP)

( * ) Notice: Subject to any disclaimer, the term of this patent is extended or adjusted under 35 U.S.C. 154(b) by 536 days.

(21) Appl. No.: 12/365,410

(22) Filed: Feb. 4, 2009

(65) Prior Publication Data

US 2009/0208102 A1 Aug. 20, 2009

(30) Foreign Application Priority Data

Feb. 7, 2008 (JP) .................................. 2008-028035

(51) Int. Cl.
*G06K 9/00* (2006.01)

(52) U.S. Cl. ..... 382/107; 382/106; 382/112; 348/208.6; 348/208.4

(58) Field of Classification Search .................. 382/106, 382/107; 348/208.4, 699; 386/46
See application file for complete search history.

(56) References Cited

U.S. PATENT DOCUMENTS

| 7,468,743 | B2 * | 12/2008 | Washisu ...................... 348/208.1 |
| 7,847,823 | B2 * | 12/2010 | Habuka et al. ............. 348/208.4 |
| 7,956,899 | B2 * | 6/2011 | Kurokawa .................. 348/208.6 |
| 2007/0236578 | A1 | 10/2007 | Nagaraj et al. | |

| 2008/0186386 | A1 | 8/2008 | Okada et al. | |
| 2009/0207260 | A1 | 8/2009 | Furukawa | |
| 2009/0213235 | A1 * | 8/2009 | Watanabe .................. 348/208.4 |

FOREIGN PATENT DOCUMENTS

| EP | 1 843 294 A1 | 10/2007 |
| JP | 8-163573 A | 6/1996 |
| JP | 8-251474 A | 9/1996 |
| JP | 3164121 B2 | 3/2001 |

OTHER PUBLICATIONS

Eiji Furukawa, "Image Pickup Apparatus and Image Pickup Method", U.S. Appl. No. 12/365,476, filed Feb. 4, 2009.

* cited by examiner

*Primary Examiner* — Daniel Mariam
*Assistant Examiner* — Nancy Bitar
(74) *Attorney, Agent, or Firm* — Holtz, Holtz, Goodman & Chick, PC

(57) ABSTRACT

An image processing device includes: a motion vector measurement region setting unit for setting a plurality of motion vector measurement regions; a motion vector calculation unit for calculating motion vectors; a motion vector reliability calculation unit for calculating a reliability of the respective motion vectors; a main region setting unit for setting a main region; and a motion vector integration processing unit for calculating an inter-image correction vector by integrating the motion vectors of the plurality of motion vector measurement regions, taking into account the reliability. The motion vector integration processing unit includes a contribution calculation unit for calculating a contribution of the respective motion vectors from a positional relationship between the respective motion vector measurement regions and the main region, and integrates the motion vectors in accordance with the reliability and the contribution.

19 Claims, 16 Drawing Sheets

IMAGE PROCESSING DEVICE AND STORAGE MEDIUM STORING IMAGE PROCESSING PROGRAM

TECHNICAL FIELD OF THE INVENTION

This invention relates to an image processing device and an image processing program which perform registration processing between a plurality of images, and more particularly to registration processing that is used when images are superimposed during image blur correction and the like.

BACKGROUND OF THE INVENTION

A block matching method or a correlation method based on a correlation calculation is known as a conventional method of detecting a motion vector of an image during image blur correction and the like.

In the block matching method, an input image signal is divided into a plurality of blocks of an appropriate size (for example, 8 pixels×8 lines), and a difference in pixel value between a current field (or frame) and a previous field is calculated in block units. Further, on the basis of this difference, a block of the previous field that has a high correlation to a certain block of the current field is searched for. A relative displacement between the two blocks is then set as the motion vector of the certain block.

In a method of searching for a block having a high correlation during block matching, the correlation is evaluated using a sum of squared difference SSD, which is the sum of squares of the pixel value difference, or a sum of absolute difference SAD, which is the absolute value sum of the pixel value difference. As SSD and SAD decrease, the correlation is evaluated to be higher. When a pixel position within a matching reference block region I of the current field is represented by p, a pixel position (a position corresponding to the pixel position p) within a subject block region I' of the previous field is represented by q, and the pixel values of the pixel positions p, q are represented by Lp, Lq, respectively, SSD and SAD are respectively expressed by the following Equations (1) and (2).

$$SSD(I, I') = \sum_{p \in I, q \in I'} (Lp - Lq)^2 \qquad (1)$$

$$SAD(I, I') = \sum_{p \in I, q \in I'} \|Lp - Lq\| \qquad (2)$$

Here, p and q are quantities having two-dimensional values. I and I' represent two-dimensional regions of the current field and the previous field, respectively. The term p∈I indicates that the coordinate p is included in the region I, and the term q∈I' indicates that the coordinate q is included in the region I'.

On the other hand, in the correlation method based on a correlation calculation, average values Ave (Lp), Ave (Lq) of the pixels p∈I and q∈I' respectively included in the matching reference block region I and the subject block region I' are calculated. A difference between the pixel value included in each block and the average value is then calculated using the following Equation (3).

$$Lp' = \frac{Lp - Ave(Lp)}{\sqrt{\frac{1}{n}\sum_{p \in I}(Lp - Ave(Lp))^2}}\bigg|_{p \in I} \qquad (3)$$

$$Lq' = \frac{Lq - Ave(Lq)}{\sqrt{\frac{1}{n}\sum_{q \in I}(Lq - Ave(Lq))^2}}\bigg|_{q \in I'}$$

Next, a normalization cross-correlation NCC is calculated using Equation (4).

$$NCC = \Sigma Lp'Lq' \qquad (4)$$

A block having a large normalization cross-correlation NCC is evaluated as having a high correlation, and the displacement between the blocks I' and I having the highest correlation is set as the motion vector.

When an object or an image pickup subject included in an image is stationary, the motion within individual regions and the motion of the entire image match, and therefore the motion vector may be calculated by disposing the block in which the correlation calculation is to be performed in an arbitrary fixed position.

It should be noted that in certain cases, it may be impossible to obtain a highly reliable motion vector due to the effects of noise or when the block is applied to a flat portion or an edge portion having a larger structure than the block. To prevent such cases from arising, a technique for performing a reliability determination during calculation of the motion vector is disclosed in JP8-163573A and JP3164121B, for example.

Further, when the object or image pickup subject included in the image includes a plurality of motions, it is a subject to calculate the motion vector of the entire image in order to correct blur, for example In JP8-251474A, the object is divided into a plurality of regions, and an important region is selected from the plurality of regions in accordance with the magnitude of the motion vector, the size of the region, and so on. The motion vector of the selected region is then set as the motion of the entire image.

In this case, region selecting means (i) select the region having the largest area from the plurality of regions, (ii) select the region having the smallest motion vector from the plurality of regions, (iii) select the region having the largest range of overlap with a previously selected region from the plurality of regions, and (iv) select one of the region having the largest range, the region having the smallest motion vector, and the region having the largest range of overlap with the previously selected region.

SUMMARY OF THE INVENTION

An aspect of this invention provides an image processing device for performing image registration processing between a plurality of images using a motion vector calculation. The image processing device comprises: a motion vector measurement region setting unit for setting a plurality of motion vector measurement regions for which a motion vector is measured; a motion vector calculation unit for calculating the motion vectors of the plurality of motion vector measurement regions; a motion vector reliability calculation unit for calculating a reliability of the respective motion vectors; a main region setting unit for setting a main region in relation to at least one image of the plurality of images; and a motion vector integration processing unit for calculating an inter-image correction vector by integrating the motion vectors of the plurality of motion vector measurement regions, taking into account the reliability. The motion vector integration processing unit includes a contribution calculation unit for calculating a contribution of the respective motion vectors from a positional relationship between the respective motion vector measurement regions and the main region, and integrates the motion vectors of the plurality of motion vector measurement regions in accordance with the reliability and the contribution.

DESCRIPTION OF THE PREFERRED EMBODIMENTS

Figure 1:
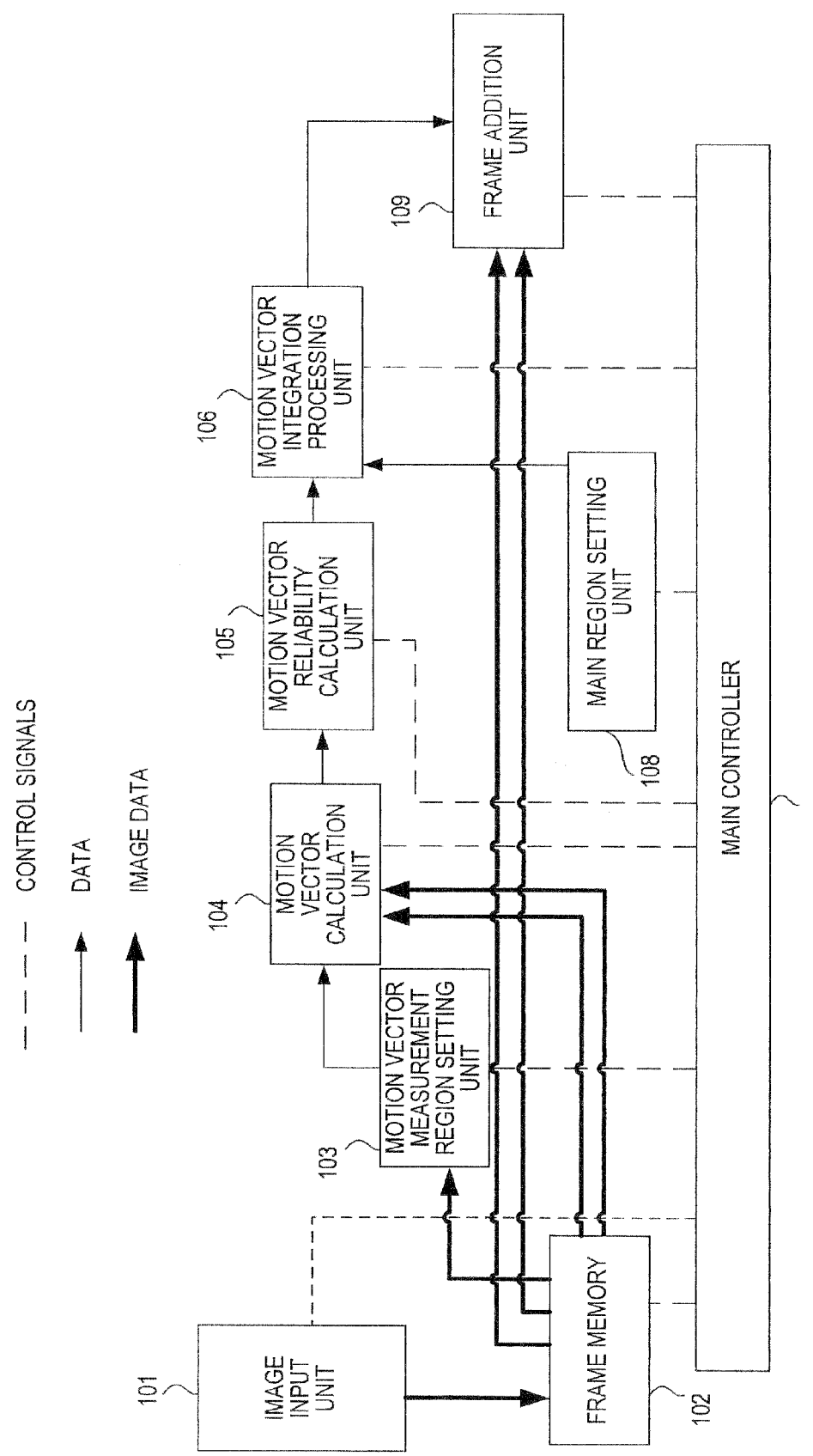
FIG. 1 is a block diagram showing an example of the constitution of an image processing device according to a first embodiment.

Referring to FIGS. 1 to 8, a first embodiment will be described. FIG. 1 shows an image processing device that performs image registration and addition processing by calculating inter-frame motion.

A main controller 100 performs overall operation control, and includes a CPU such as a DSP (Digital Signal Processor), for example. In FIG. 1, dotted lines denote control signals, thin lines denote the flow of data such as motion vectors and reliability values, and thick lines denote the flow of image data. The respective parts (or the whole) of the image processing device, to be described below, may be constituted by a logic circuit. Alternatively, the respective parts (or the whole) of the image processing device, to be described below, may be constituted by a memory that stores data, a memory that stores a calculation program, a CPU (Central Processing Unit) that executes the calculation program, an input/output interface, and so on.

An image input from an image input unit 101 is temporarily stored in a frame memory 102. A region setting unit 103 sets predetermined motion vector measurement regions for a reference frame (reference image) stored in the frame memory as a reference in order to calculate motion between the reference frame and a subject frame (subject image). The region setting unit 103 sets block regions (motion vector measurement blocks) in the reference image in lattice form as the motion vector measurement regions. A motion vector calculation unit 104 uses the image data of the reference frame and the subject frame stored in the frame memory and data relating to the block regions set by the region setting unit 103. Thus, the motion vector calculation unit 104 calculates a block region position of the subject frame having a high correlation with a block region of the reference frame using a correlation calculation of a sum of squared difference SSD, a sum of absolute difference SAD, a normalization cross-correlation NCC, and so on. A relative displacement between the block region of the reference frame and the block region of the subject frame is then calculated as a motion vector.

A motion vector reliability calculation unit 105 calculates a reliability of the motion vector. A main region setting unit 108 sets position information (coordinate of centroid, dimensions, etc.) of a main region (for example, the region of a main object). A motion vector integration processing unit 106 calculates a representative value (correction vector) of an inter-frame motion vector by integrating motion vector data in accordance with a positional relationship between the block regions and the main region of the reference frame. A frame addition unit 109 performs frame addition using the image data of the reference frame and the subject frame stored in the frame memory and data relating to the correction vector.

Figure 2:
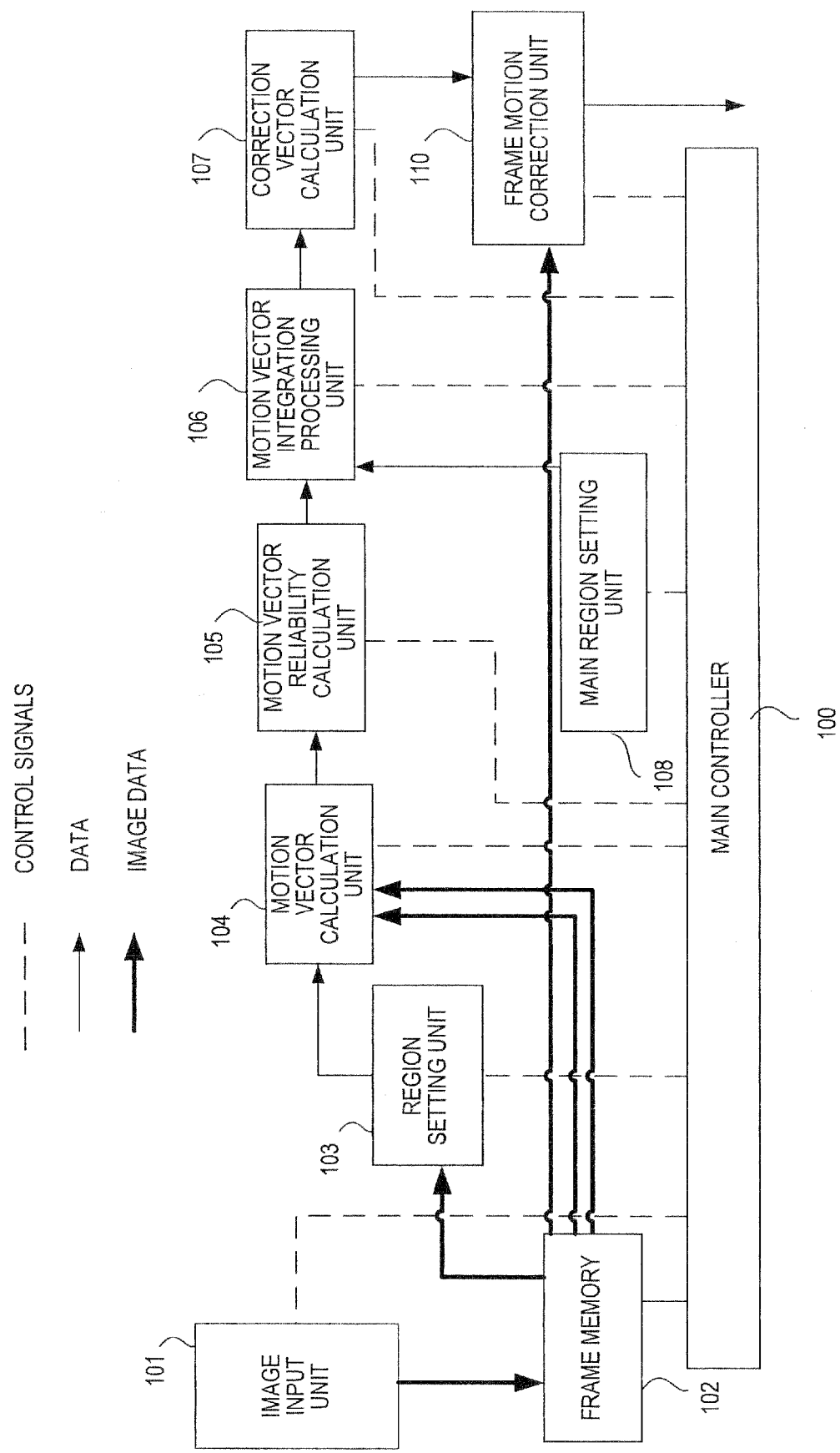
FIG. 2 is a block diagram showing another example of the constitution of an image processing device according to the first embodiment.

It should be noted that in FIG. 1, an example of frame addition is shown, whereas in FIG. 2, an example of moving image blur correction, in which the subject frame is positioned relative to the reference frame using the correction vector, is shown. FIG. 2 is a constitutional diagram of an image processing device that performs blur correction on a moving image through frame position correction. A frame motion correction unit 110 corrects the subject frame to reduce blur relative to the reference frame, and transfers data to a display device not shown in the drawing or a storage device not shown in the drawing.

Next, an outline of an operation for calculating the reliability of the motion vector, which is performed by the motion vector reliability calculation unit 105, will be described.

A method of determining the reliability of the motion vector on the basis of the statistical property of an inter-frame (inter-image) correlation value in block units and a method of determining the reliability of the motion vector on the basis of the statistical property of a correlation value within a frame are known.

When the reliability is determined on the basis of the statistical property of an inter-frame (inter-image) correlation value, a sum of squares SSD (expressed by the following Equation (5)) of a difference between pixel values included in a block Ii of the reference frame and a block Ij of the subject frame is used as a correlation value between the motion vector measurement region of the reference frame and a corresponding image region of the subject frame, for example.

$$SSD(i, j) = \sum_{p \in Ii, q \in Ij} (Lp - Lq)^2 \quad (5)$$

$$Ii = \begin{cases} x \in \left(bxi - \frac{1}{2}h, \; bxi + \frac{1}{2}h\right) \\ y \in \left(byi - \frac{1}{2}v, \; byi + \frac{1}{2}v\right) \end{cases}$$

$$Ij = \begin{cases} x \in \left(bxi + bxj - \frac{1}{2}h, \; bxi + bxj + \frac{1}{2}h\right) \\ y \in \left(byi + byj - \frac{1}{2}v, \; byi + byj + \frac{1}{2}v\right) \end{cases}$$

Here, coordinates (bxi, byi) denote a centroid position (or a central coordinate) of an ith block set by the region setting unit 103, and are prepared in a number corresponding to the number of blocks Ii. The symbols "h", "v" represent the dimension of the block in a horizontal direction and a vertical direction, respectively. Coordinates (bxj, byj) denote a centroid position of a jth subject block Ij, and are prepared in accordance with a block matching search range.

The SSD (i, j) of the ith block takes various values depending on the number j of the subject block, whereas a reliability Si of the ith block is determined on the basis of a difference between a minimum value and an average value of the SSD (i, j). The reliability Si may simply be considered as the difference between the minimum value and the average value of the SSD (i, j).

The reliability based on the statistical property of the correlation value SSD corresponds to the structural features of the region through the following concepts. (i) In a region having a sharp edge structure, the reliability of the motion vector is high, and as a result, few errors occur in the subject block position exhibiting the minimum value of the SSD. When a histogram of the SSD is created, small SSD values are concentrated in the vicinity of the position exhibiting the minimum value. Accordingly, the difference between the minimum value and average value of the SSD is large. (ii) In the case of a textured or flat structure, the SSD histogram is flat, and as a result, the difference between the minimum value and average value of the SSD is small. Hence, the reliability is low. (iii) In the case of a repeating structure, the positions exhibiting the minimum value and a maximum value of the SSD are close, and positions exhibiting a small SSD value are dispersed. As a result, the difference between the minimum value and the average value is small, and the reliability is low. Thus, a highly reliable motion vector for the ith block is selected on the basis of the difference between the minimum value and the average value of the SSD (i, j).

When the reliability is determined on the basis of the statistical property of a correlation value within a frame, a correlation value between one motion vector measurement region of the reference image and another motion vector measurement region of the reference image is calculated, and the reliability Si is calculated on the basis of a minimum value of the correlation value (see JP2005-26048 IA).

It should be noted that the reliability may also be determined in accordance with an edge quantity of each block, as described in JP3164121B.

Figure 3:
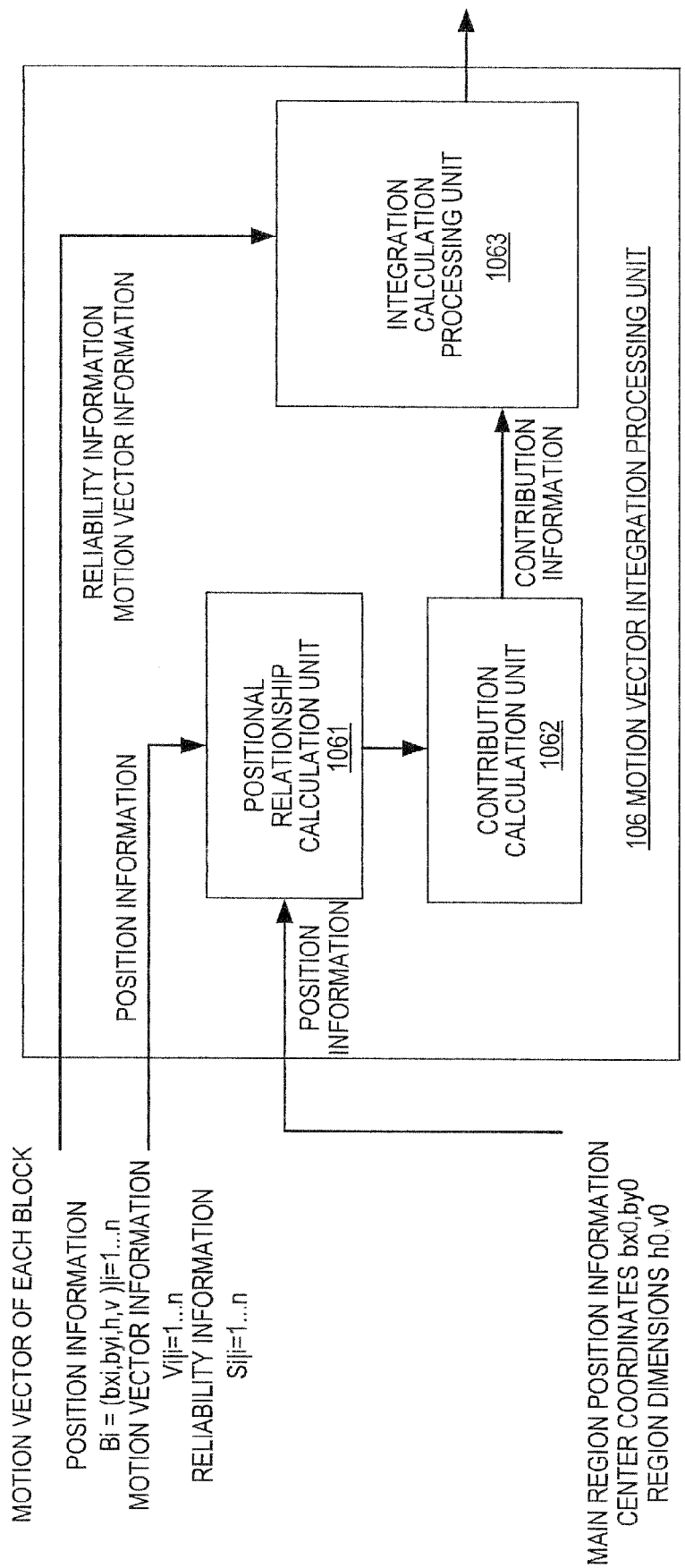
FIG. 3 is a block diagram showing the constitution of a motion vector integration processing unit.

FIG. 3 shows in detail the constitution of the motion vector integration processing unit 106. A positional relationship calculation unit 1061 calculates a positional relationship using position information (centroid coordinates (bx0, by0) and the region dimensions h0, v0) relating to the main region and position information (centroid coordinates (bxi, byi) and the region magnitude h, v) relating to the motion vector measurement regions. A contribution calculation unit 1062 calculates a contribution of the motion vector of the respective motion vector measurement regions using the positional relationship information.

Figure 4:
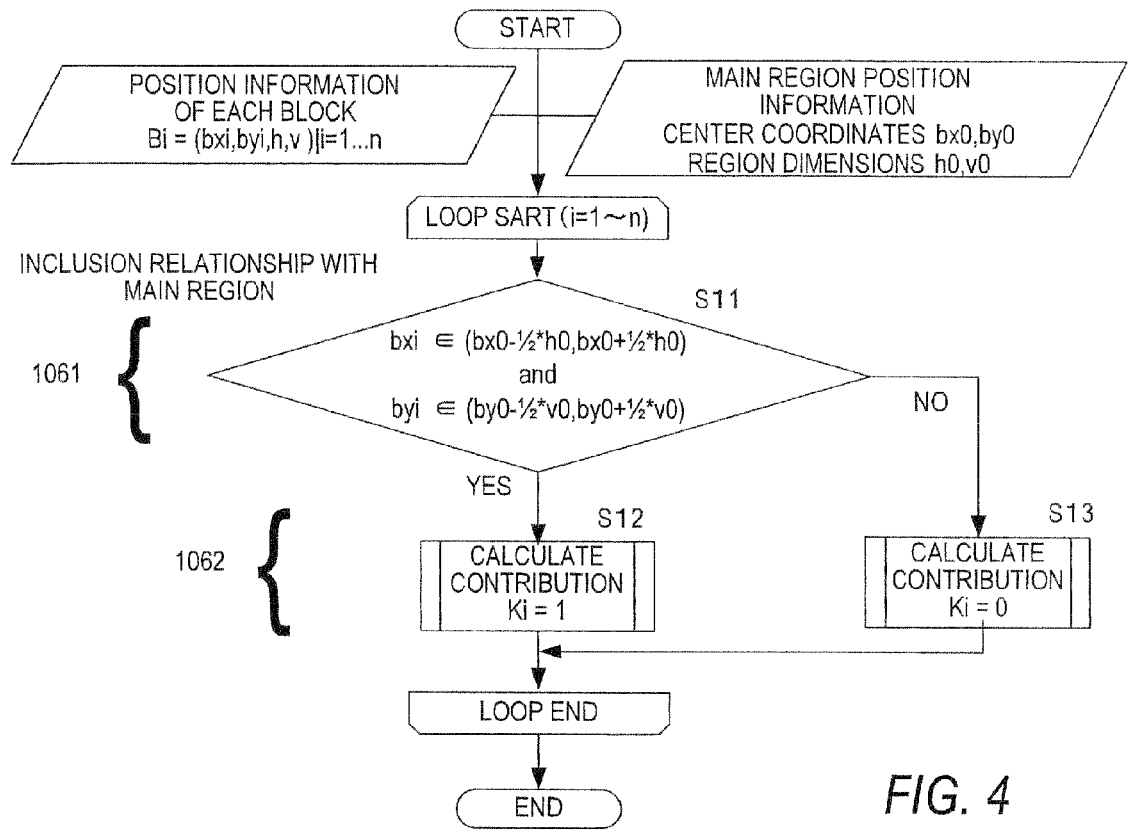
FIG. 4 is a flowchart showing an example of contribution calculation processing.

FIG. 4 shows a flowchart for calculating the contribution using an inclusion relationship between the motion vector measurement regions and the main region. First, a determination is made as to whether or not the centroid coordinates (bxi, byi) of the ith motion vector measurement region (motion vector measurement block) are included in the main region using the following Equation (6) (S11).

$$bxi \in \left(bx0 - \frac{1}{2}h0, \; bx0 + \frac{1}{2}h0\right) \quad (6)$$

and $$byi \in \left(by0 - \frac{1}{2}v0, \; by0 + \frac{1}{2}v0\right)$$

When an affirmative result is obtained, 1 is set as a contribution Ki (Ki=1) (S12), and when a negative result is obtained, 0 is set as the contribution Ki (Ki=0) (S13).

Further, as a modified example of the contribution calculation described above, threshold processing may be performed in accordance with an area of overlap between the main region and the ith motion vector measurement region. More specifically, if the area of overlap between the main region and the ith motion vector measurement block is equal to or greater than a predetermined value, Ki=1 is set, and if not, Ki=0 is set.

Figure 5:
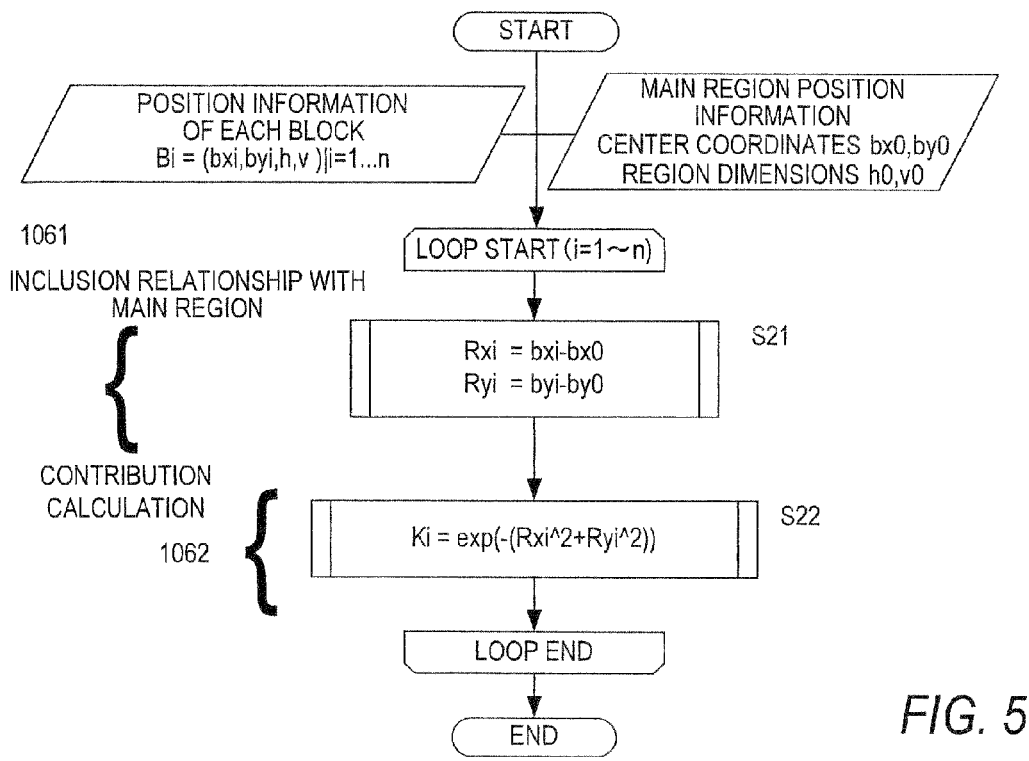
FIG. 5 is a flowchart showing another example of contribution calculation processing.

FIG. 5 shows a flowchart for calculating the contribution using another method. A distance between the main region and the respective motion vector measurement regions (a distance between the centroid coordinates thereof is calculated using the following Equation (7) (S21). The contribution is then calculated in accordance with a function (Equation (8)) whereby the contribution decreases as the square of the distance increases (S22)

$$Rxi = bxi - bx0$$

$$Ryi = byi - by0 \quad (7)$$

$$Ki = \exp(-C(Rxi^2 + Ryi^2)) \quad (8)$$

Figure 6:
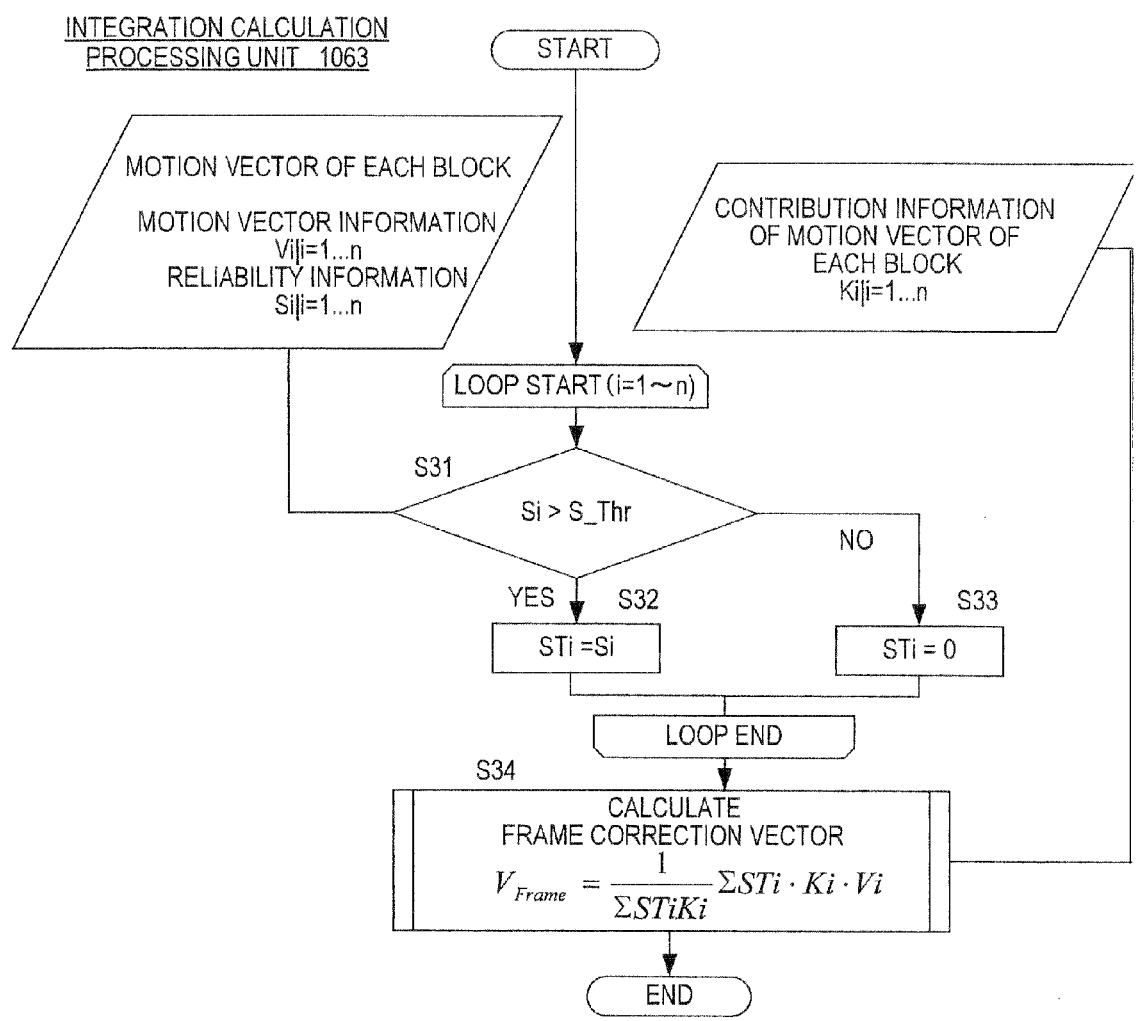
FIG. 6 is a flowchart showing an example of processing (correction vector calculation) performed by an integration calculation processing unit of the motion vector integration processing unit.

FIG. 6 shows a flowchart of processing performed by an integration calculation processing unit 1063. In a step S31, threshold processing is performed in relation to the reliability Si to determine whether or not the reliability Si is greater than a threshold S_Thr. A final reliability STi used to calculate a correction vector $V_{frame}$ is determined by leaving the contribution of a block in which the reliability Si is greater than the threshold as is (S32) and setting the contribution of a block in which the reliability Si is equal to or smaller than the threshold at 0 (S33). As a result, the integration result of the motion vector is stabilized.

A frame correction vector $V_{Frame}$ is calculated by performing weighted addition on (or calculating a weighted average of) the motion vectors of the plurality of motion vector measurement regions using the final reliability STi, the contribution Ki, and a measurement result Vi of the motion vector of the ith motion vector measurement region in accordance with Equation (9) (S34).

$$V_{Frame} = \frac{1}{\Sigma STiKi} \Sigma STi \cdot Ki \cdot Vi \qquad (9)$$

Here, the denominator on the right side is a normalization coefficient. A weighting coefficient STi Ki is set in accordance with the product of the reliability STi and the contribution Ki.

Figure 7:
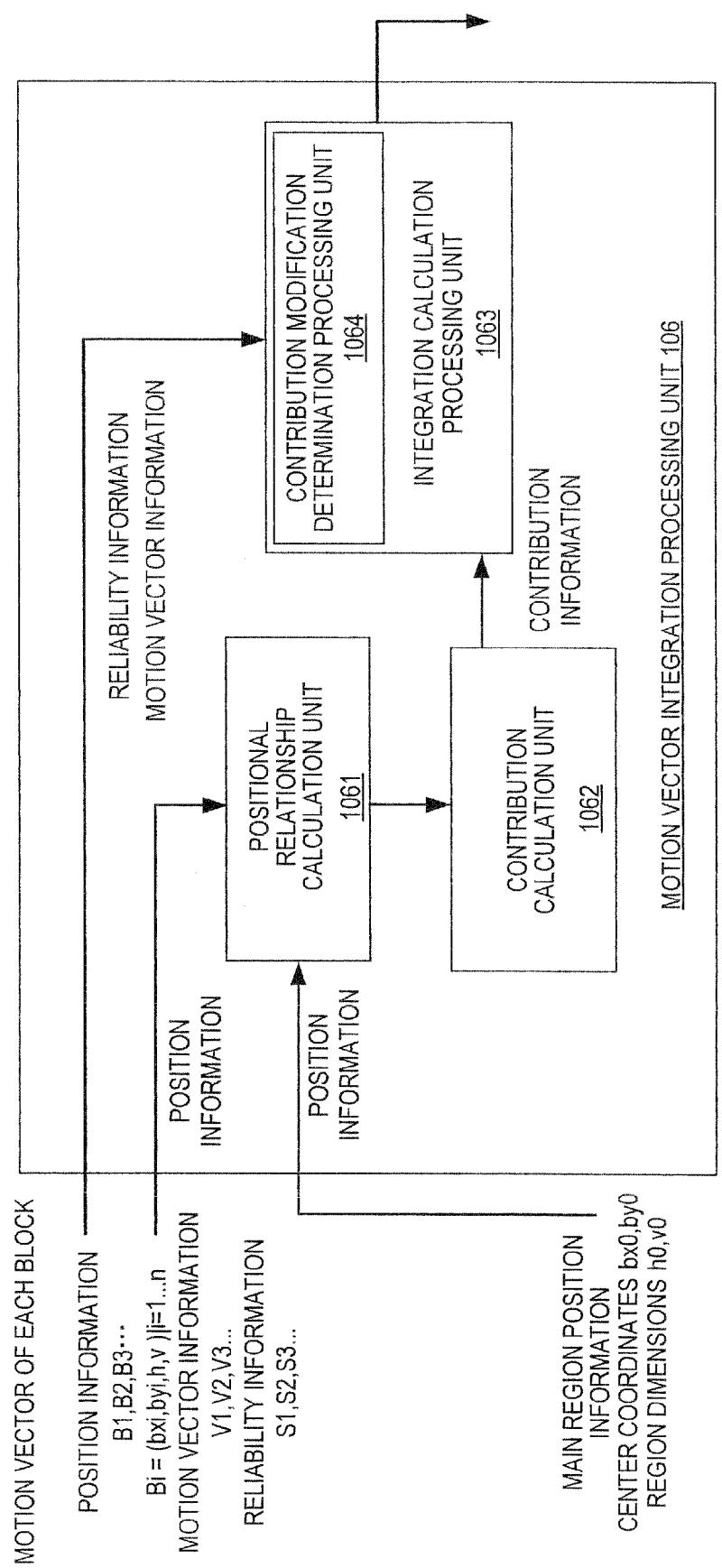
FIG. 7 is a block diagram showing another constitution of the motion vector integration processing unit.
Figure 8:
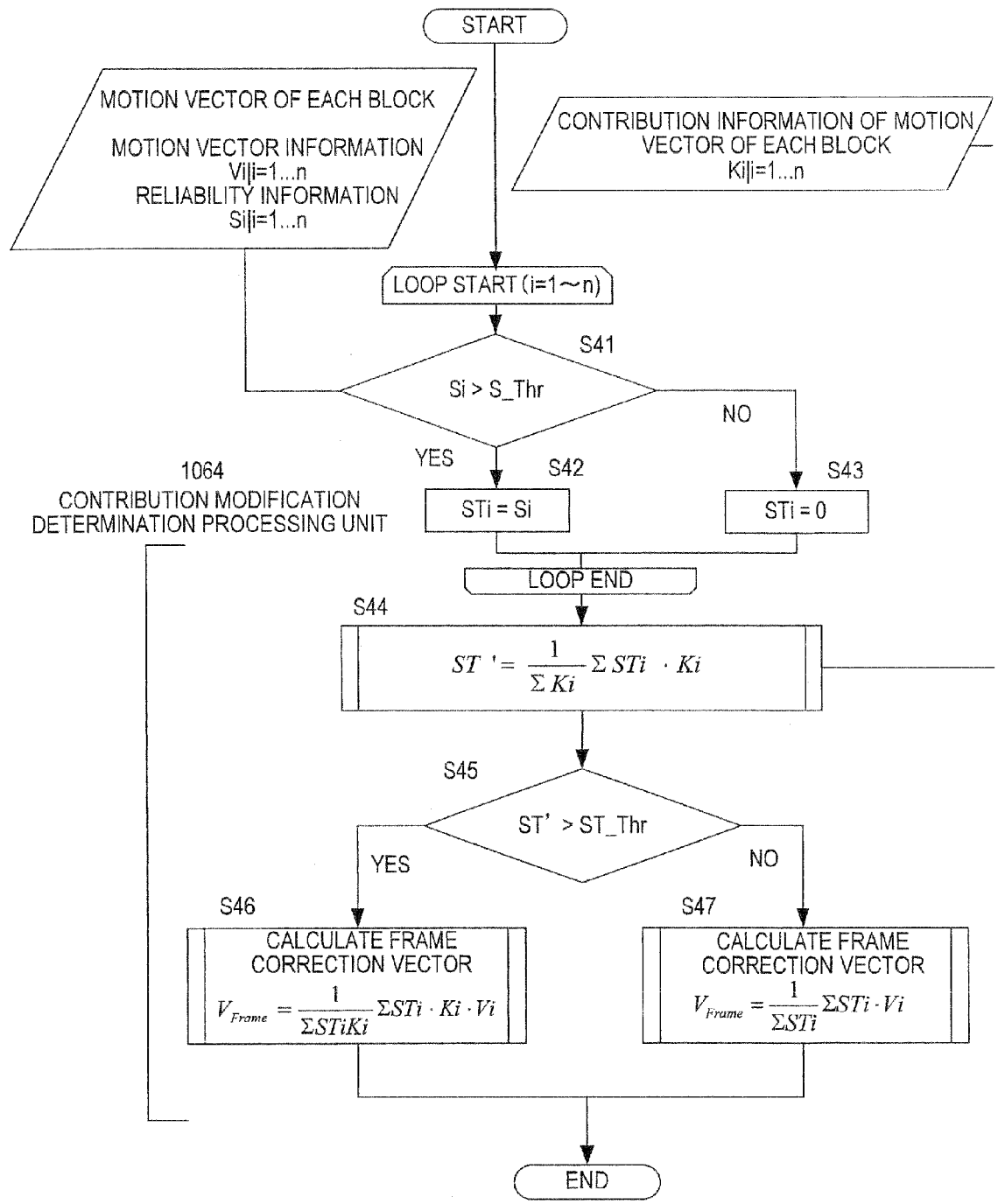
FIG. 8 is a flowchart showing another example of processing (correction vector calculation) performed by the integration calculation processing unit of the motion vector integration processing unit.

As shown in FIG. 7, a contribution modification determination processing unit 1064 may be provided in the integration calculation processing unit 1063 of the motion vector integration processing unit 106. FIG. 8 shows a calculation flowchart of the integration calculation processing unit 1063 having the contribution modification determination processing unit 1064. The contribution modification determination processing unit 1064 modifies the contribution when a predetermined condition is satisfied in relation to the reliability and the contribution. Steps S41 to S43 are identical to S31 to S33 in FIG. 6. In S44, a reliability index ST' taking the contribution into account is calculated using Equation (10).

$$ST' = \frac{1}{\Sigma Ki} \Sigma STi \cdot Ki \qquad (10)$$

Next, a determination is made as to whether or not ST' is greater than a threshold ST_Thr (S45). When ST' is greater than the threshold ST_Thr, the frame correction vector (Equation (11)) that takes the contribution into account is employed (S46).

$$V_{Frame} = \frac{1}{\Sigma STiKi} \Sigma STi \cdot Ki \cdot Vi \qquad (11)$$

When ST' is smaller than the threshold ST_Thr, the correction vector is calculated from Equation (12) on the basis of the reliability alone, without taking the contribution Ki into account (S47). In other words, all of the contributions Ki are modified to a predetermined fixed value such that the contributions Ki of all blocks are identical, and the correction vector is determined on the basis of the reliability alone.

$$V_{Frame} = \frac{1}{\Sigma STi} \Sigma STi \cdot Vi \qquad (12)$$

When the correction vector is determined by calculating Equation (11), in which the position information relating to the main region is prioritized, the stability of the correction vector may be low, and therefore an error may occur when a plurality of images are superimposed. Accordingly, when ST' is smaller than the threshold, it is difficult to estimate the motion of the main region with a stability that satisfies a predetermined criterion, and therefore the correction vector is calculated taking into account the reliability of the motion vector alone (Equation (12)).

The main region setting unit 108 sets a main region for limiting the block position in which the motion vector is calculated, using position information relating to a main object, which is obtained through object recognition, information relating to contrast intensity, information relating to a focus position of a multi-point automatic focus (multi-point AF), and so on.

Next, a second embodiment will be described with reference to FIGS. 9-11. In the first embodiment described above, the correction vector is determined by weighted addition (Equation (9)), but in the second embodiment, a different method is employed. In the second embodiment, histogram processing is performed in relation to a motion vector Vi (Equation (13)) in which the reliability Si is equal to or greater than the threshold S_Thr and the contribution Ki is equal to or greater than a predetermined value K_Thr, whereupon vector quantities (orientation and magnitude) are divided into appropriate bins and a vector having a high frequency is employed as the correction vector.

$$Vi = (x_i, y_i) \left| \begin{array}{l} Si > S\_Thr \\ Ki > K\_Thr \end{array} \right. \qquad (13)$$

Here, a bin is a dividing region or class in the histogram (or frequency distribution). A width of the bin in an x axis direction is bin_x, and a width of the bin in a y axis direction is bin_y.

Figure 9:
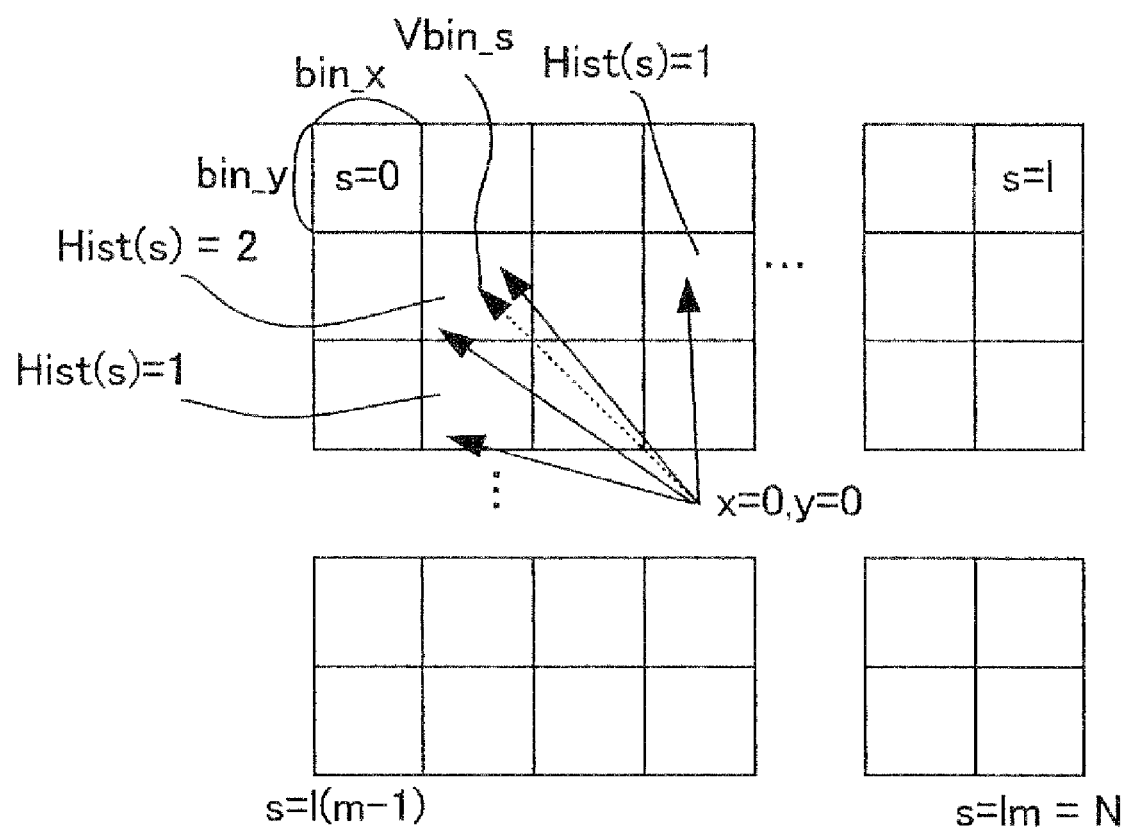
FIG. 9 is a view showing creation of a motion vector histogram according to a second embodiment.

As shown in FIG. 9, when the horizontal/vertical direction coordinates of the motion vector are set as x, y and x, y enter an sth (s=0 . . . Nl(N=l×m)) bin, the frequency of the bin is increased by 1. It should be noted that the bin number s is obtained from the position on the coordinates using Equation (14)

$$x'=\text{floor}(x/bin\_x)$$

$$y'=\text{floor}(y/bin\_y)$$

$$s=x'+y'\cdot l \qquad (14)$$

Here, floor is a floor function. Further, "l" denotes a horizontal direction range in which the histogram is created, and "m" denotes a vertical direction range in which the histogram is created.

The bin frequency is counted by increasing a frequency Hist(s) of the sth bin every time the motion vector Vi enters the sth bin, as shown in Equation (15).

$$Hist(s)=Hist(s)+1 \qquad (15)$$

This count is performed in relation to all of the motion vectors Vi for which Si is equal to or greater than S_Thr and Ki is equal to or greater than K_Thr.

FIG. 9 shows a bin arrangement for determining a vector histogram and the manner in which the number Hist(s) of vectors entering the bin is counted using the processing of Equation (14).

The inter-frame correction vector $V_{frame}$ is set as a representative vector (for example, a centroid vector of a bin) representing the bin s having the highest frequency, as shown in Equation (16).

$$V_{frame}=V_{bin\_s}|s=sup_s(Hist(s)) \qquad (16)$$

Here, $V_{bin\_s}$ is a vector representing the respective bins, and s=$sup_s$ (Hist(s)) is the number s of the bin having the highest frequency.

Figure 10:
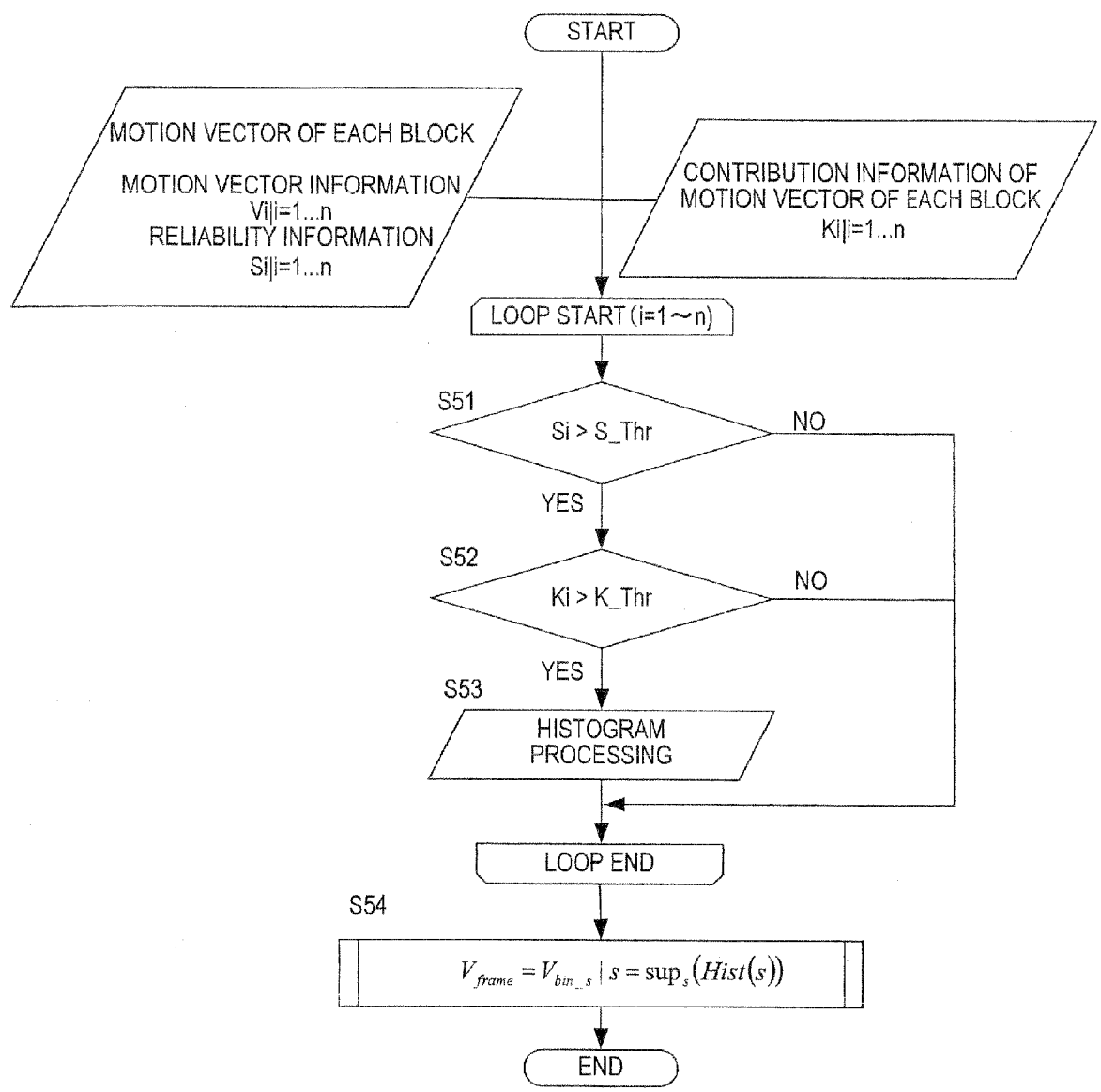
FIG. 10 is a flowchart showing an example of processing (correction vector calculation) performed by a motion vector integration processing unit according to the second embodiment.

FIG. 10 is a flowchart of correction vector calculation processing for integrating a plurality of motion vectors through histogram processing. Here, histogram processing is only performed for a block i having a reliability that is equal to or greater than the threshold S_Thr and a contribution that is equal to or greater than the threshold K_Thr. Therefore, a determination is made in a step S51 as to whether or not the reliability Si is equal to or greater than the threshold S_Thr, and a determination is made in a step S52 as to whether or not the contribution Ki is equal to or greater than the threshold K_Thr. Motion vectors Vi in which the reliability Si is smaller than the threshold S_Thr or the contribution Ki is smaller than the threshold K_Thr are excluded from the histogram processing. In a step S53, the histogram processing described above is performed such that the motion vectors Vi are allocated to the bins. By repeating the steps S51 to S53, a histogram is created. In a step S54, the representative vector representing the bin having the highest frequency is set as the inter-image correction vector, as described above.

Figure 11:
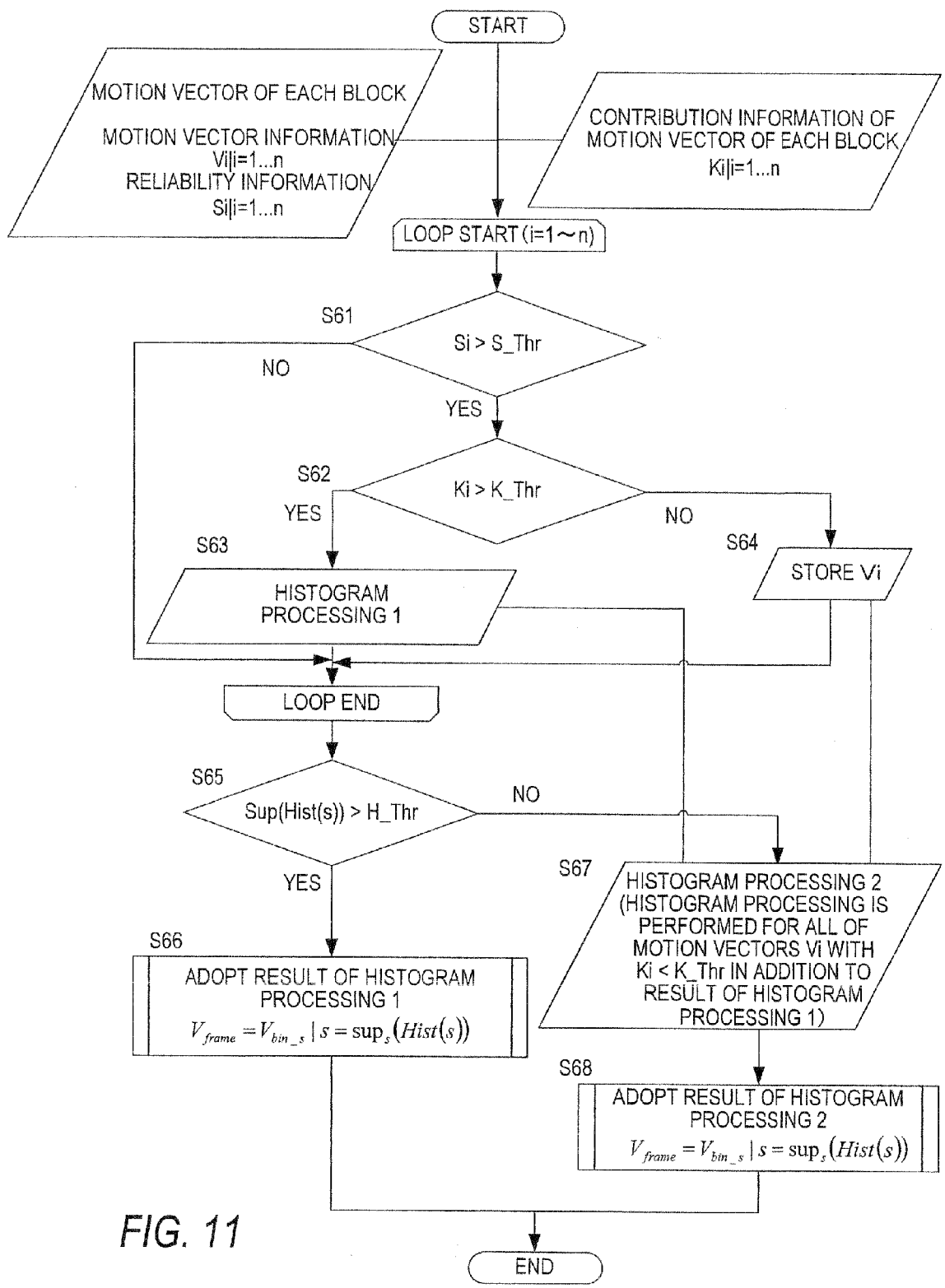
FIG. 11 is a flowchart showing another example of processing (correction vector calculation) performed by the motion vector integration processing unit according to the second embodiment.

As regards resetting of the contribution corresponding to S47 of FIG. 8, when a maximum frequency value sup (Hist (s)) of the histogram does not equal or exceed a predetermined value, histogram processing is performed such that motion vectors are not selected in accordance with the Ki>K_Thr condition (S67 in FIG. 11). In other words, histogram processing is performed on all of the motion vectors Vi that satisfy the Si>S_Thr condition, irrespective of Ki. Here, the result of the histogram processing performed on Ki<K_Thr motion vectors (histogram processing 2) is added to the result of the histogram processing performed by selecting motion vectors that satisfy the Ki>K_Thr condition (histogram processing 1).

As shown in FIG. 11, in a step S63, histogram processing 1 is performed on the blocks in which Si and Ki are both greater than their respective thresholds. When Ki<K_Thr, data relating to the motion vectors with Ki<K_Thr are stored in a step S64. When the maximum frequency value sup(Hist(s)) is equal to or greater than a threshold H_Thr in a step S65, the representative vector of the bin having the highest frequency is set as the correction vector from the result of histogram processing 1 (S66). When the maximum frequency value is smaller than the threshold, histogram processing 2 is performed (S67). In histogram processing 2, the result of separating all of the Ki<K_Thr motion vectors Vi into the bins is added to the histogram obtained in histogram processing 1. Thus, a histogram is determined in relation to all of the motion vectors Vi that satisfy the Si>S_Thr condition, irrespective of Ki, and the representative vector of the bin having the highest frequency is set as the correction vector (S68).

Figure 12:
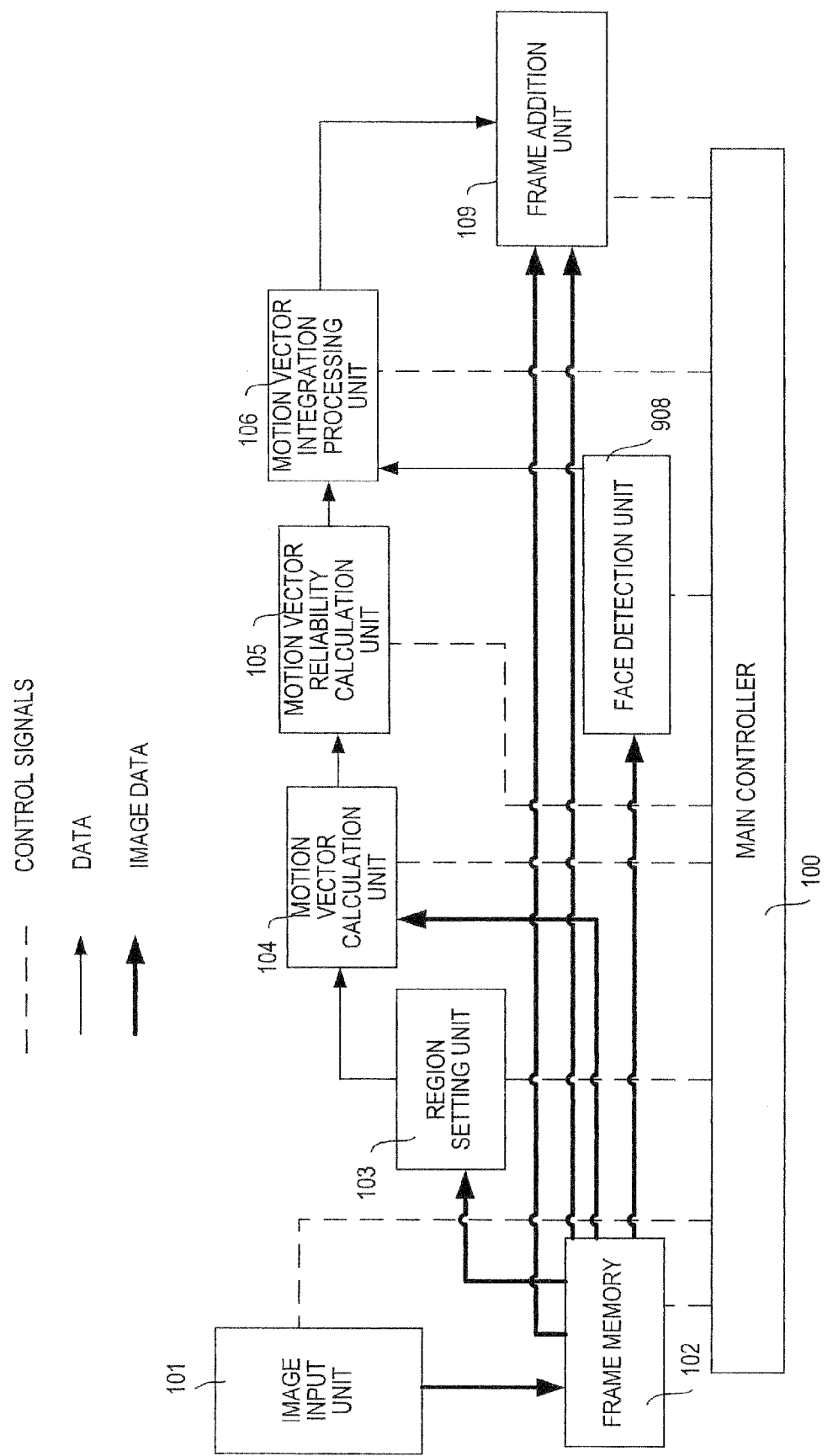
FIG. 12 is a block diagram showing the constitution of an image processing device according to a third embodiment.

Next, referring to FIG. 12, a third embodiment will be described. In the third embodiment, the main region is the region of a human face. A face detection unit (face detecting means) 908 for detecting a human face is used as the main region setting unit. The face detection unit 908 calculates the position and size of the region of the human face included in the input image. A method and an application thereof described in *Paul Viola, Michael Jones: Robust Realtime Object Detection, Second International Workshop on Statistical and Computational Theories of Vision-Modeling, Learning, Computing and Sampling* 2001, for example, are used as the face detection method. Using the algorithm of this method, the position and size of the face can be calculated. It should be noted that face detection may be performed using another method.

Figure 13A:
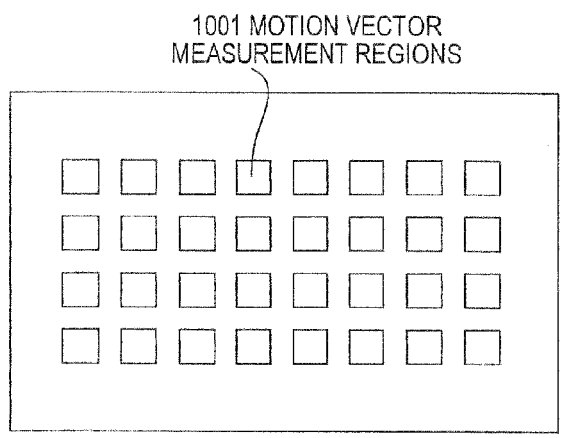
FIGS. 13A to 13C are views showing main region setting according to the third embodiment.
Figure 13B:
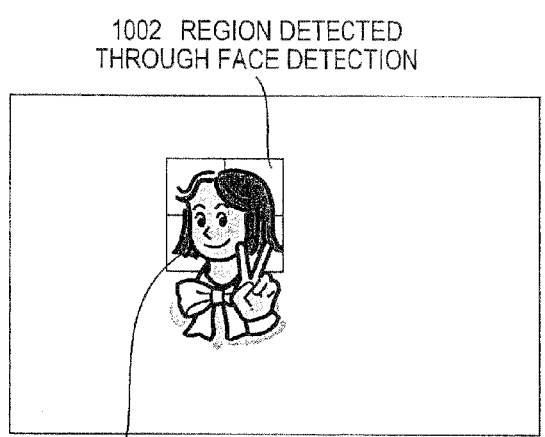
Figure 13C:
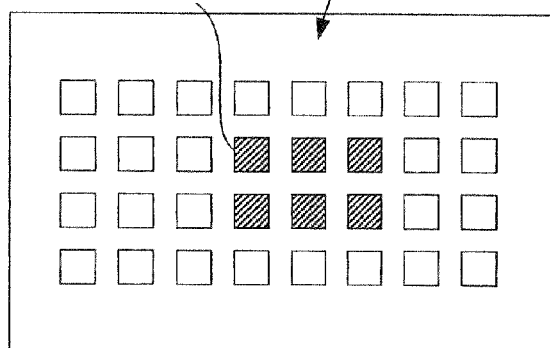

FIG. 13A shows a motion vector measurement regions 1001 set by the region setting unit 103. FIG. 13B shows a region 1002 detected through face detection. As shown in FIG. 13C, by integrating two sets of information relating to motion vector measurement and face detection, a correction vector is calculated. Motion vector data in the region 1003 in which the face is positioned are taken into account particularly preferentially. To calculate the contribution, the method shown in FIGS. 4 and 5 or a method taking into account the area of overlap in the regions may be used. The integration calculation shown in FIG. 6 is performed taking into consideration the reliability of the motion vector and the contribution, which is calculated from the positional relationship between the face region and the motion vector measurement region, and thus the inter-frame correction vector is calculated (Equation 11).

Contribution modification determination processing such as that shown in FIG. 8 is also performed. When the reliability ST' of the motion vector is lower than a certain threshold if the contribution is taken into account, the correction vector is calculated without taking the contribution into account. The correction vector is then calculated from the reliability in all of the motion vector measurement regions (all of the blocks) set by the region setting unit 103 (Equation (12)).

Figure 14:
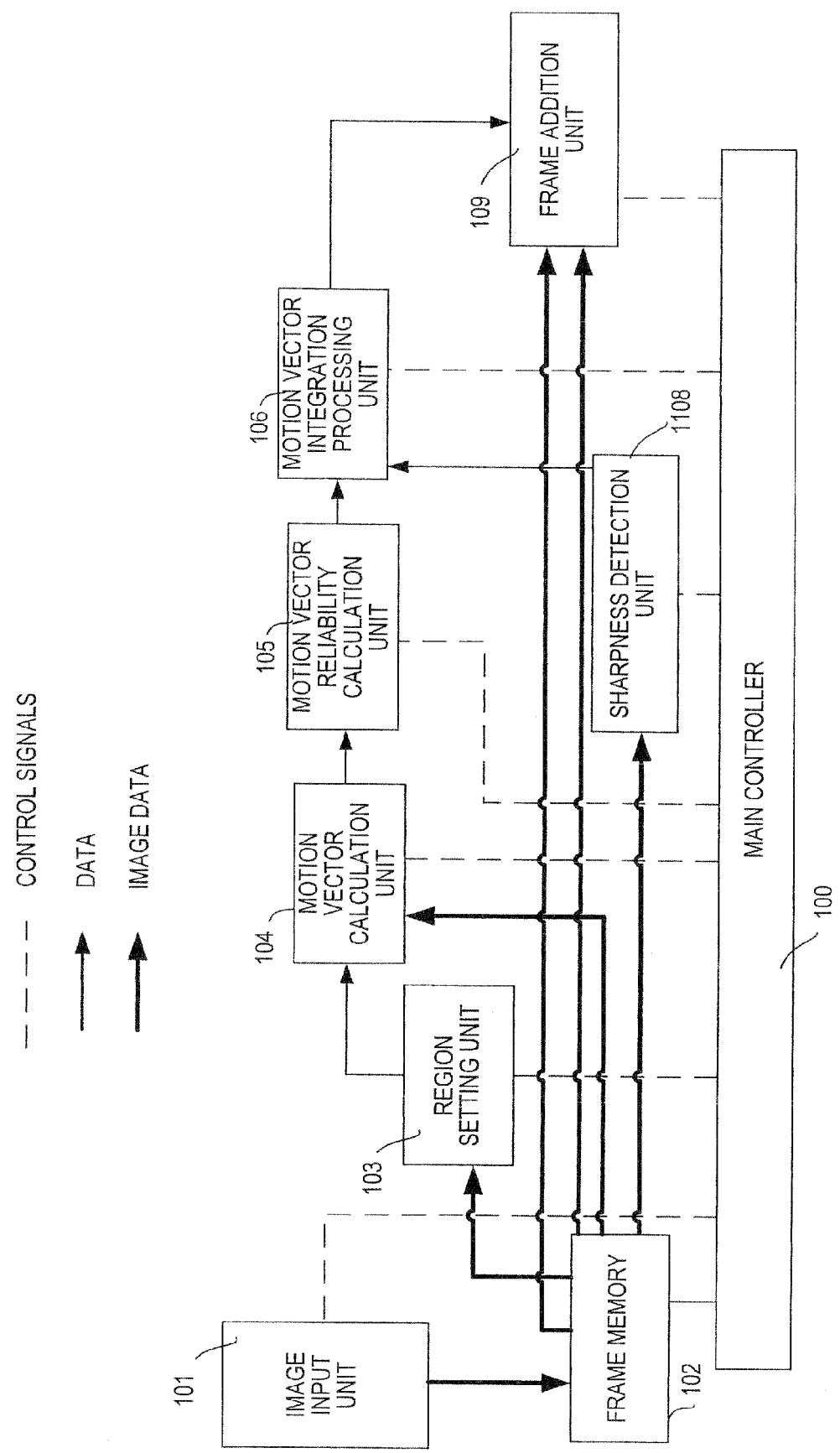
FIG. 14 is a block diagram showing the constitution of an image processing device according to a fourth embodiment.

Next, referring to FIG. 14, a fourth embodiment will be described. In the fourth embodiment, the main region is a region having a high degree of sharpness, and therefore a sharpness detection unit (contrast detection unit) 1108 employed in Imager AF is used as the main region setting unit. Filtering means (a differential filter or the like) for detecting an edge feature quantity (for example, a difference between pixel values of adjacent pixels) are used to detect the sharpness. The sharpness may correspond to a contrast value (for example, a total sum of the absolute value of a difference between pixel values of the adjacent pixels of the same color). A region in which the sharpness is equal to or greater than a predetermined value may be set as the main region.

Figure 15:
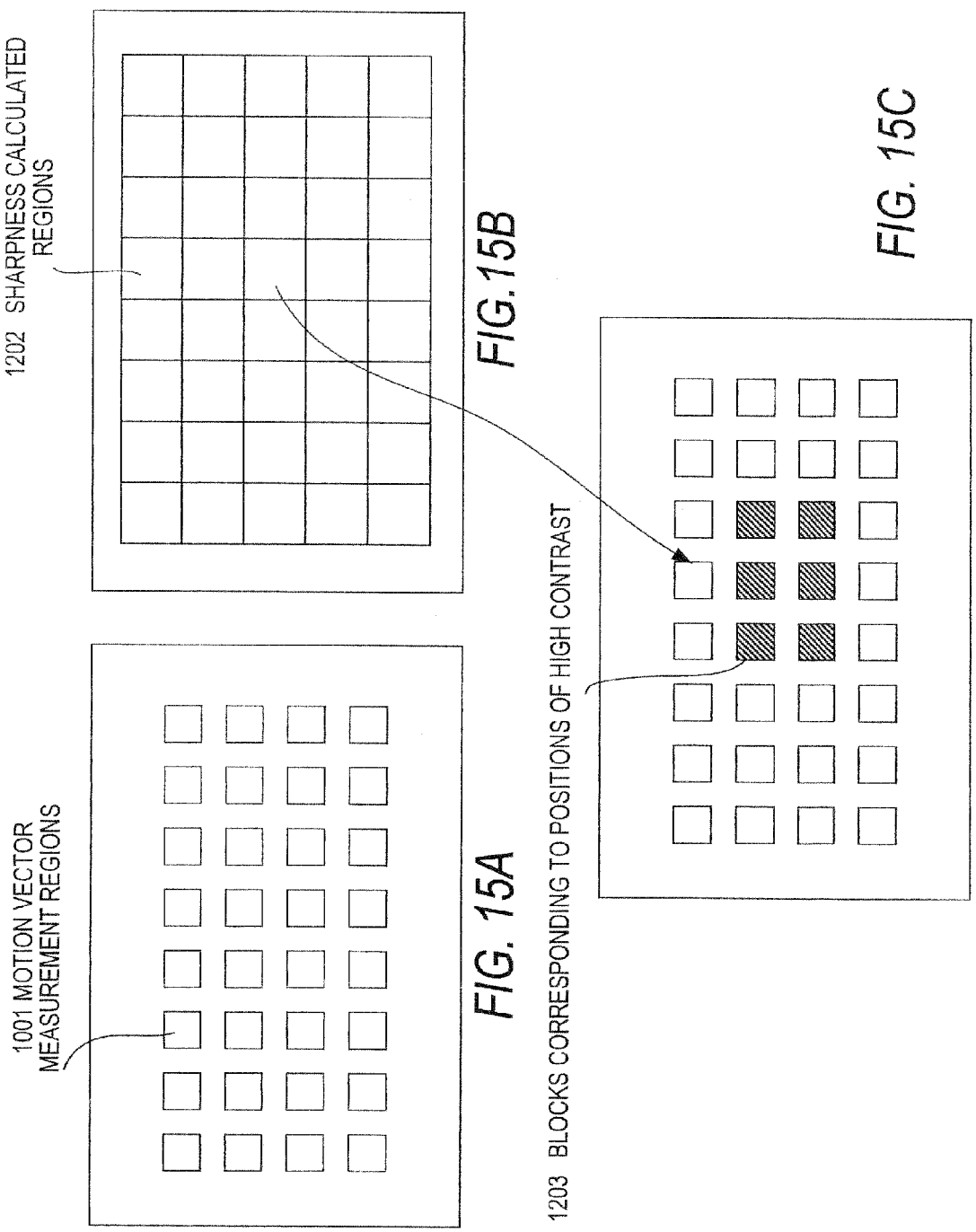
FIGS. 15A to 15C are views showing main region setting according to the fourth embodiment.

FIG. 15A shows the motion vector measurement regions 1001 set by the region setting unit 103. FIG. 15B shows a plurality of regions 1202 in which sharpness detection is performed. As shown in FIG. 15C, by integrating two sets of information relating to motion vector measurement and sharpness measurement, a correction vector is calculated. Motion vector data in the regions 1203 in which the sharpness is high are taken into account particularly preferentially. To calculate the contribution the method shown in FIGS. 4 and 5 or a method taking into account the area of overlap in the regions may be used. The integration calculation shown in FIG. 6 is performed taking into consideration the contribution, which is calculated from the positional relationship between the regions having high contrast and the motion vector measurement region, and thus the inter-frame correction vector is calculated (Equation 11).

Contribution modification determination processing such as that shown in FIG. 8 is also performed. When the reliability ST' of the motion vector is lower than a certain threshold if the contribution is taken into account, the correction vector is calculated without taking the contribution into account. The correction vector is then calculated from the reliability in all of the motion vector measurement regions (all of the blocks) set by the region setting unit 103 (Equation (12)).

Figure 16:
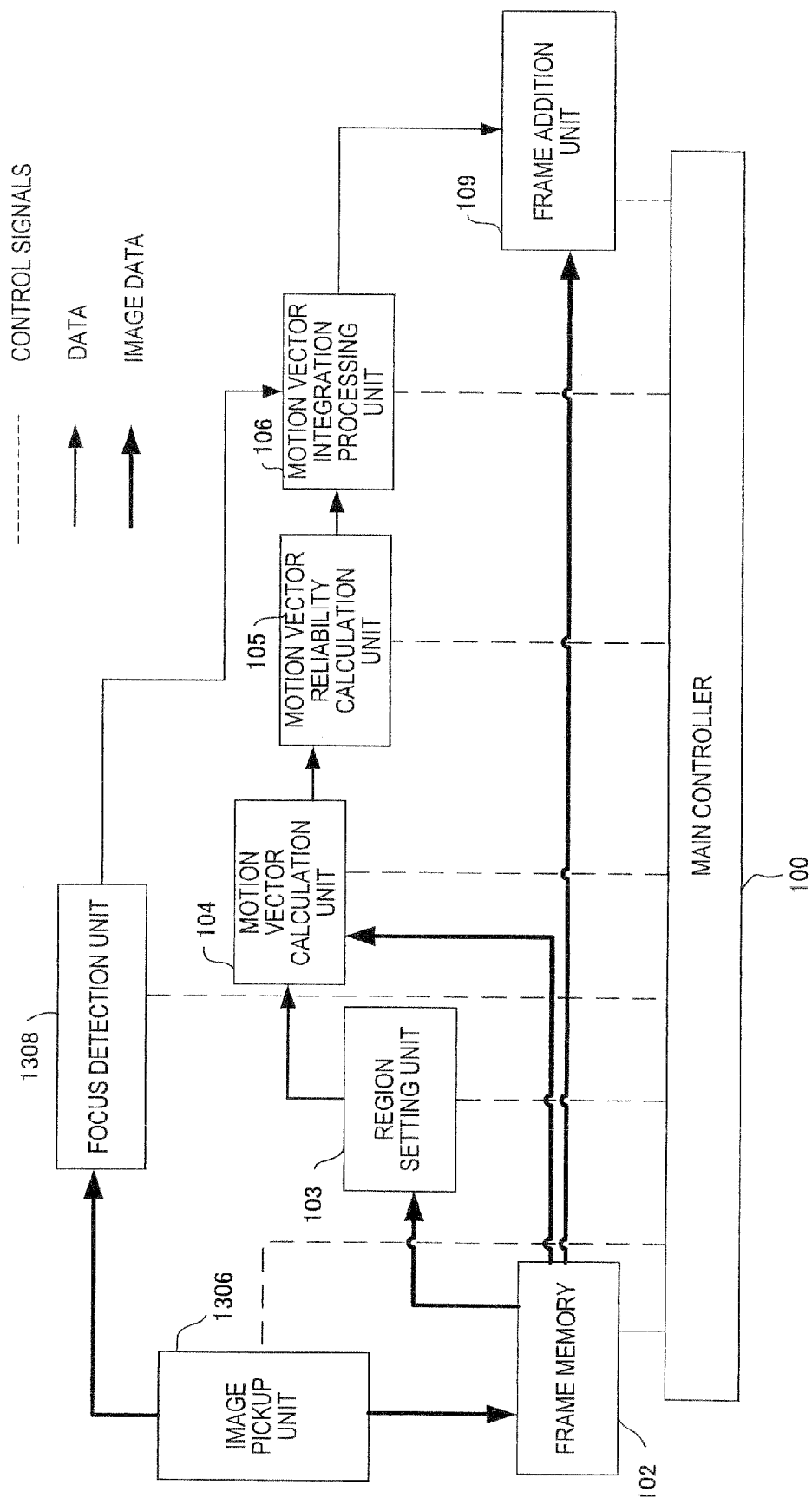
FIG. 16 is a block diagram showing the constitution of an image processing device according to a fifth embodiment.

Next, referring to FIG. 16, a fifth embodiment will be described. In the fifth embodiment, FIG. 16 shows an image pickup device comprising the image processing device and an image pickup unit 1306. A focus detection unit 1308 employed in an AF mechanism (automatic focus adjustment mechanism) is used as the main region setting unit. Focus detection is performed by means of phase difference detection. More specifically, an evaluation as to whether or not an object is in focus is made in accordance with a phase difference between two corresponding images formed in a separator optical system by performing pupil splitting in an image pickup optical system.

Figure 17B:
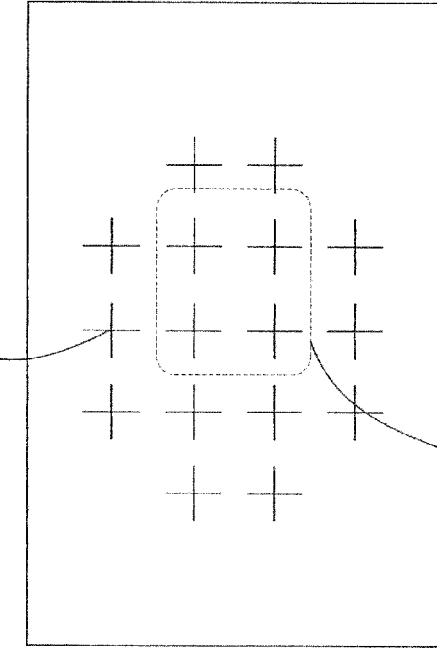
FIGS. 17A to 17C are views showing main region setting according to the fifth embodiment.
Figure 17A:
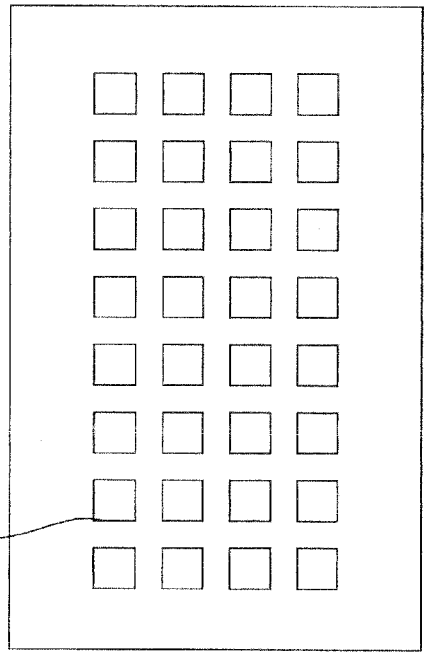
Figure 17C:
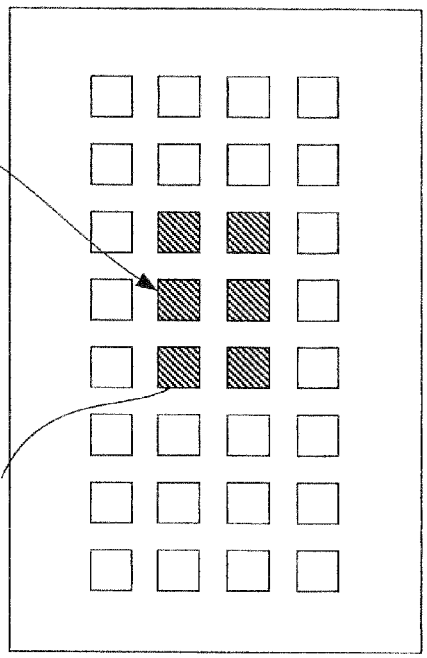

In an image pickup device such as a digital camera, in-focus points can be set on a main object to be photographed by a photographer, and the position of the main object to be photographed by the photographer can be detected according to the in-focus points. FIG. 17A shows the motion vector measurement regions 1001 set by the region setting unit 103. A "+" symbol 1402 in FIG. 17B shows a focus detection position. The in-focus points (indicated by dotted lines) can be detected by detecting the above-described phase difference in the focus detection position. As shown in FIG. 17C, by integrating information relating to the in-focus points and the motion vector measurement position, a correction vector is calculated. Motion vector data in a region 1403 in which the object is in focus are taken into account particularly preferentially. To calculate the contribution, the method shown in FIGS. 4 and 5 or a method taking into account the area of region overlap may be used. The integration calculation shown in FIG. 6 is performed taking into consideration the reliability of the motion vector and the contribution, which is calculated from the positional relationship between the in-focus points and the motion vector measurement region, and thus the inter-frame correction vector is calculated (Equation 11).

Contribution modification determination processing such as that shown in FIG. 8 is also performed. When the reliability ST' of the motion vector is lower than a certain threshold if the contribution is taken into account, the correction vector is calculated without taking the contribution into account. The correction vector is then calculated from the reliability in all of the motion vector measurement regions (all of the blocks) set by the region setting unit 103 (Equation (12)).

In each of the embodiments described above, it is assumed that the processing performed by the image processing device is hardware processing, but this invention need not be limited to such a constitution. For example, a constitution in which the processing is performed by separate software may be employed. The software is stored on a computer-readable storage medium as a program. The program is encoded and stored in a computer-readable format. The computer includes a microprocessor and a memory, for example. The program includes a program code (command) for causing the computer to execute the processing of the respective units described above.

This invention is not limited to the embodiments described above, and may of course be subjected to various modifications within the scope of the technical spirit thereof.

The entire contents of JP2008-28035A, filed on Feb. 7, 2008, are incorporated into this specification by reference.

What is claimed is:

1. An image processing device that performs image registration processing between a plurality of images through a motion vector calculation, comprising:
    a motion vector measurement region setting unit for setting a plurality of motion vector measurement regions for which a motion vector is measured;
    a motion vector calculation unit for calculating the motion vectors of the plurality of motion vector measurement regions;
    a motion vector reliability calculation unit for calculating a reliability of the respective motion vectors;
    a main region setting unit for setting a main region in relation to at least one image of the plurality of images; and
    a motion vector integration processing unit for calculating an inter-image correction vector by integrating the motion vectors of the plurality of motion vector measurement regions, taking into account the reliability,
    wherein the motion vector integration processing unit includes a contribution calculation unit for calculating a contribution of the respective motion vectors from a positional relationship between the respective motion vector measurement regions and the main region, and integrates the motion vectors of the plurality of motion vector measurement regions in accordance with the reliability and the contribution.

2. The image processing device as defined in claim 1, wherein the motion vector integration processing unit calculates the inter-image correction vector by setting a weighting coefficient in accordance with the reliability and the contribution and subjecting the motion vectors of the plurality of motion vector measurement regions to weighted addition in accordance with the weighting coefficient.

3. The image processing device as defined in claim 2, wherein, when the reliability calculated by the motion vector reliability calculation unit is smaller than a threshold, the motion vector integration processing unit resets the reliability to zero.

4. The image processing device as defined in claim 2, wherein, when a motion vector of an ith motion vector measurement region is represented by Vi, the reliability thereof is represented by STi, and the contribution thereof is represented by Ki, the motion vector integration processing unit calculates the weighting coefficient of the motion vector of the ith motion vector measurement region on the basis of a product of the reliability STi and the contribution Ki, and calculates the correction vector $V_{Frame}$ using a following equation $$V_{Frame} = \frac{1}{\Sigma STiKi} \Sigma STi \cdot Ki \cdot Vi.$$

5. The image processing device as defined in claim 2, wherein, when a predetermined condition relating to the reliability and the contribution is satisfied, the motion vector integration processing unit modifies the contribution calculated by the contribution calculation unit.

6. The image processing device as defined in claim 5, wherein, when the reliability of an ith motion vector measurement region is represented by STi and the contribution thereof is represented by Ki, the motion vector integration processing unit calculates a quantity ST' expressed by a following equation $$ST' = \frac{1}{\Sigma Ki} \Sigma STi \cdot Ki$$

on the basis of a product of the reliability STi and the contribution Ki, and
the predetermined condition is that the quantity ST' is smaller than a threshold.

7. The image processing device as defined in claim 1, wherein the motion vector integration processing unit performs histogram processing on a motion vector selected in accordance with the reliability and the contribution, and sets a representative vector representing a bin having a maximum frequency as the inter-image correction vector.

8. The image processing device as defined in claim 7, wherein, when the maximum frequency is smaller than a predetermined value, the motion vector integration processing unit performs histogram processing on a motion vector selected in accordance with the reliability alone and sets the representative vector of the bin having the maximum frequency as the inter-image correction vector.

9. The image processing device as defined in claim 1, wherein the motion vector calculation unit calculates the motion vector by performing block matching between a motion vector measurement region of a reference image and an image region of a subject image, and the motion vector reliability calculation unit calculates the reliability on the basis of a statistical property of a correlation value between the motion vector measurement region and the image region of the subject image.

10. The image processing device as defined in claim 9, wherein the correlation value is a sum of squares (SSD) of a difference in pixel value between the motion vector measurement region and the image region of the subject image, and the reliability is calculated on the basis of a difference between a minimum value and an average value of the correlation value.

11. The image processing device as defined in claim 1, wherein the motion vector reliability calculation unit calculates a correlation value between one motion vector measurement region of a reference image and another motion vector measurement region of the reference image, and calculates the reliability on the basis of a minimum value of the correlation value.

12. The image processing device as defined in claim 1, wherein, when a central coordinate of the motion vector measurement region is included in the main region, the contribution is set to be large, and when the central coordinate of the motion vector measurement region is not included in the main region, the contribution is set to be small.

13. The image processing device as defined in claim 1, wherein the contribution is set to be larger as an area of overlap between the motion vector measurement region and the main region increases.

14. The image processing device as defined in claim 1, wherein the contribution decreases as a distance between the motion vector measurement region and the main region increases.

15. The image processing device as defined in claim 1, wherein the main region setting unit detects a specific object region of an image and sets the main region on the basis of the detected specific object region.

16. The image processing device as defined in claim 1, wherein the main region setting unit detects a sharpness of an image and sets the main region on the basis of the sharpness.

17. The image processing device as defined in claim 1, further comprising an image pickup unit.

18. The image processing device as defined in claim 17, wherein the image pickup unit includes a focal point detection unit that detects a in-focus point of an image in which focus is achieved, and the main region is set on the basis of the in-focus point.

19. A computer-readable recording device including an image processing program, encoded and stored therein in a computer-readable format, the image processing program performing image registration processing between a plurality of images through a motion vector calculation, wherein the image processing program causes a computer to execute a method comprising:

a motion vector measurement region setting step for setting a plurality of motion vector measurement regions for which a motion vector is measured;

a motion vector calculating step for calculating the motion vectors of the plurality of motion vector measurement regions;

a motion vector reliability calculating step for calculating a reliability of the respective motion vectors;

a main region setting step for setting a main region in relation to at least one image of the plurality of images; and a motion vector integration processing step for calculating an inter-image correction vector by integrating the motion vectors of the plurality of motion vector measurement regions, taking into account the reliability, and wherein the motion vector integration processing step includes a contribution calculating step for calculating a contribution of the respective motion vectors from a positional relationship between the respective motion vector measurement regions and the main region, and integrates the motion vectors of the plurality of motion vector measurement regions in accordance with the contribution.

* * * * *